(12) United States Patent
Moisanen et al.

(10) Patent No.: US 10,772,033 B2
(45) Date of Patent: Sep. 8, 2020

(54) AVOIDING RESELECTION OF A FAKE CELL IN A WIRELESS COMMUNICATION NETWORK

(71) Applicant: MediaTek Singapore Pte. Ltd., Singapore (SG)

(72) Inventors: Matti Moisanen, Oulu (FI); Marko Niemi, Oulu (FI)

(73) Assignee: MediaTek Singapore Pte. Ltd., Singapore (SG)

( * ) Notice: Subject to any disclaimer, the term of this patent is extended or adjusted under 35 U.S.C. 154(b) by 96 days.

(21) Appl. No.: 15/416,718

(22) Filed: Jan. 26, 2017

(65) Prior Publication Data

US 2017/0215132 A1    Jul. 27, 2017

Related U.S. Application Data

(60) Provisional application No. 62/287,478, filed on Jan. 27, 2016.

(51) Int. Cl.
| | |
|---|---|
| *H04W 16/18* | (2009.01) |
| *H04W 48/16* | (2009.01) |
| *H04W 48/20* | (2009.01) |
| *H04B 7/0413* | (2017.01) |
| *H04B 7/06* | (2006.01) |
| *H04B 7/0417* | (2017.01) |

(Continued)

(52) U.S. Cl.
CPC .......... *H04W 48/16* (2013.01); *H04B 7/0413* (2013.01); *H04B 7/0417* (2013.01); *H04B 7/0452* (2013.01); *H04B 7/0613* (2013.01); *H04L 1/06* (2013.01); *H04W 16/18* (2013.01); *H04W 16/24* (2013.01); *H04W 48/20* (2013.01); *H04W 52/242* (2013.01); *B64C 39/024* (2013.01); *H01Q 1/246* (2013.01); *H01Q 25/002* (2013.01); *H04L 1/0681* (2013.01); *H04L 1/0687* (2013.01); *H04W 24/06* (2013.01); *H04W 88/02* (2013.01); *Y02D 70/1262* (2018.01); *Y02D 70/21* (2018.01)

(58) Field of Classification Search
CPC ..... H04W 60/00; H04W 76/18; H04W 48/08; H04W 8/06; H04W 48/20; H04W 36/14; H04W 36/0038; H04W 12/12; H04W 24/04; Y02D 70/1262; H04L 1/06; H04L 1/04; H04L 1/20; H04L 5/00; H04L 5/0003; H04B 7/0617; H04B 7/0413; H04B 7/0613; H04B 7/0619; H04B 7/0626; H04B 7/0697
USPC .......... 455/435.1, 410, 418, 404.1, 411, 419
See application file for complete search history.

(56) References Cited

U.S. PATENT DOCUMENTS

| | | | | |
|---|---|---|---|---|
| 2009/0104906 A1* | 4/2009 | Lee | ........................ | H04W 76/18 455/435.1 |
| 2011/0268092 A1* | 11/2011 | Tiwari | .................. | H04W 60/02 370/335 |

(Continued)

*Primary Examiner* — Fred A Casca
(74) *Attorney, Agent, or Firm* — Oblon, McClelland, Maier & Neustadt, L.L.P.

(57) ABSTRACT

Aspects of the disclosure provide a method for avoiding reselection of fake cell. The method includes transmitting a first request for network service of a wireless communication network in a first cell from user equipment, receiving a first reject message without integrity protection, adding the first cell to a set-aside cell list, and selecting a cell from other cells that are not included in the set-aside cell list to request network service.

22 Claims, 8 Drawing Sheets

(51) Int. Cl.
*H04B 7/0452* (2017.01)
*H04W 52/24* (2009.01)
*H04W 16/24* (2009.01)
*H04L 1/06* (2006.01)
H04W 88/02 (2009.01)
B64C 39/02 (2006.01)
H01Q 25/00 (2006.01)
H01Q 1/24 (2006.01)
H04W 24/06 (2009.01)

(56) References Cited

U.S. PATENT DOCUMENTS

| | | | | |
|---|---|---|---|---|
| 2012/0077456 | A1* | 3/2012 | Tiwari | H04W 48/16 |
| | | | | 455/404.1 |
| 2013/0203411 | A1* | 8/2013 | Cheng | H04W 48/18 |
| | | | | 455/435.1 |
| 2013/0316699 | A1* | 11/2013 | Jheng | H04W 48/18 |
| | | | | 455/423 |
| 2015/0141004 | A1* | 5/2015 | Cheekatla | H04W 24/02 |
| | | | | 455/434 |
| 2015/0156692 | A1* | 6/2015 | Kim | H04W 8/02 |
| | | | | 455/436 |
| 2016/0255674 | A1* | 9/2016 | Niemi | H04W 76/18 |
| | | | | 455/435.1 |
| 2016/0381613 | A1* | 12/2016 | Duan | H04W 36/24 |
| | | | | 370/331 |

\* cited by examiner

AVOIDING RESELECTION OF A FAKE CELL IN A WIRELESS COMMUNICATION NETWORK

INCORPORATION BY REFERENCE

This present disclosure claims the benefit of U.S. Provisional Application No. 62/287,478, "Setting of Lookalike Suitable Cells Aside" filed on Jan. 27, 2016, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A false base station can create a fake cell and convince a mobile device to camp on the fake cell. While camping on the fake cell, the mobile device may make a request for a network service. In response to the request, the false base station can transmit a non-integrity-protected reject message to the mobile device. Upon receipt of the reject message, the mobile device can switch into an out of service state until the mobile device is restarted.

SUMMARY

Aspects of the disclosure provide a method for avoiding reselection of a fake cell. The method includes transmitting a first request for network service of a wireless communication network in a first cell from user equipment, receiving a first reject message without integrity protection, adding the first cell to a set-aside cell list, and selecting a cell from other cells that are not included in the set-aside cell list to request network service.

In one embodiment, the method includes selecting a second cell excluded from the set-aside cell list to transmit a second request for network service, and adding the second cell to the set-aside cell list when a second reject message without integrity protection is received. In one example, the method further includes repeating selecting a second cell excluded from the set-aside cell list and adding the second cell to the set-aside cell list when a second reject message without integrity protection is received until a second request for network service is accepted. In another example, the method further includes repeating selecting a second cell excluded from the set-aside cell list and adding the second cell to the set-aside cell list when a second reject message without integrity protection is received until times of receiving the second reject messages reach a threshold.

In one example, the previously added cells are removed from the set-aside cell list when no more cells are available for selection. In another example, a third cell is removed from the set-aside cell list after the third cell has been added to the set-aside cell list for a preconfigure period of time. In a further example, a fourth cell is removed from the set-aside cell list when the user equipment travels a preconfigured distance from a location where the fourth cell is added to the set-aside cell list.

Aspects of the disclosure provide user equipment for avoiding reselection of a fake cell. The user equipment includes processing circuitry configured to transmit a first request for network service of a wireless communication network in a first cell from user equipment, receive a first reject message without integrity protection, add the first cell to a set-aside cell list, and select a cell from other cells that are not included in the set-aside cell list to request network service.

Aspects of the disclosure provide a non-transitory computer readable medium storing program instructions. The program instructions can cause a processor to perform operations of transmitting a first request for network service of a wireless communication network in a first cell from user equipment, receiving a first reject message without integrity protection, adding the first cell to a set-aside cell list, and selecting a cell from other cells that are not included in the set-aside cell list to request network service.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
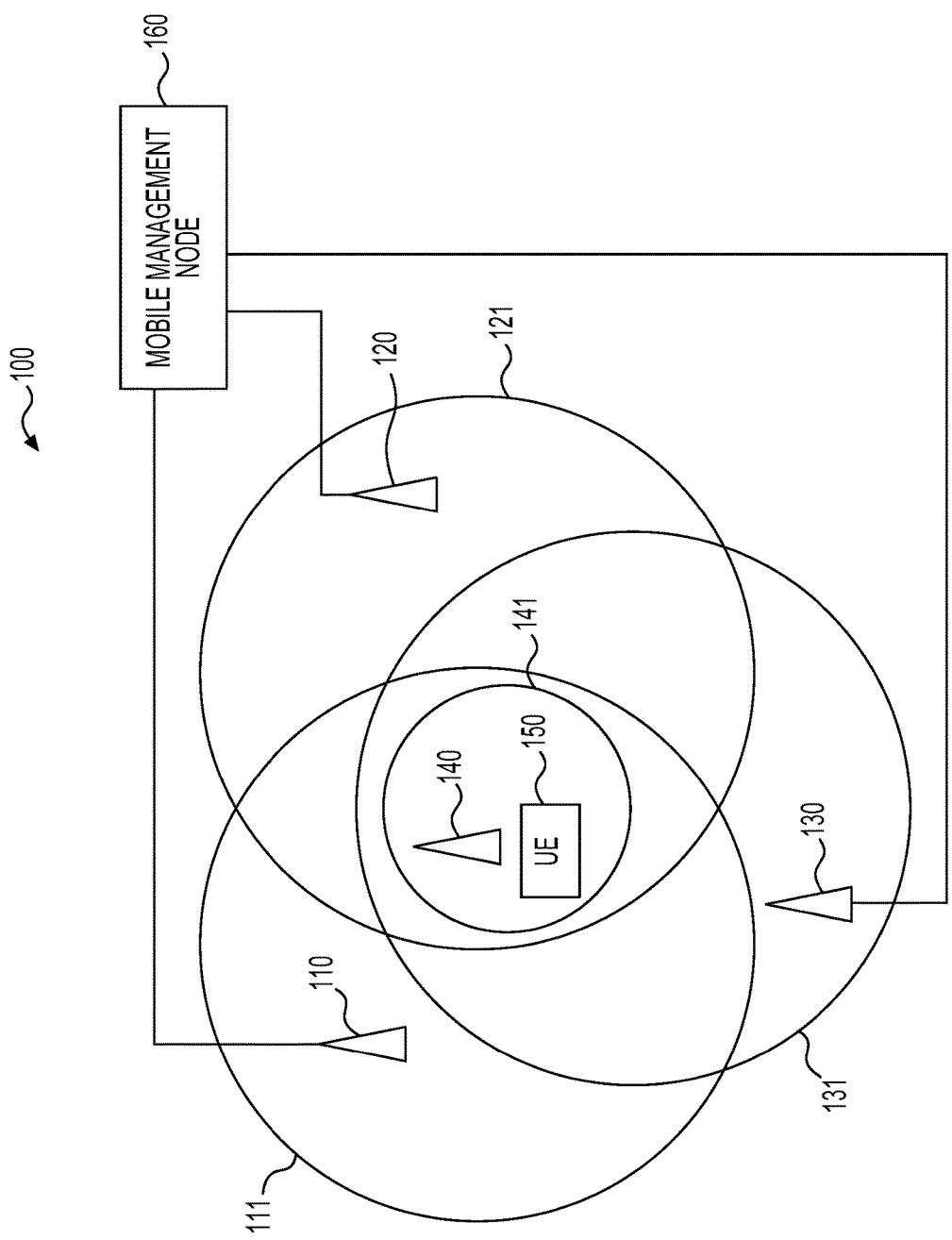
FIG. 1 shows a wireless communication network according to an embodiment of the disclosure.

FIG. 1 shows a wireless communication network 100 according to an embodiment of the disclosure. The wireless communication network 100 includes a first base station 110, a second base station 120, and a third base station 130. The base stations 110-130 each create three cells 111-131, respectively. The wireless communication network 100 further includes a mobility management node (MMN) 160. The MMN 160 is coupled with the base stations 110-130 as shown in FIG. 2. User equipment (UE) 150 is within coverage of the wireless communication network 100.

In one example, a false base station 140 is introduced into the coverage area of the wireless network 100 by an attacker. The false base station 140 can be employed to cause a denial of service attack to UEs near the false station 140. In order to solve the above attack caused by the false base station 140, in one example, the UE 150 can be configured to perform a process to avoid the attack caused by the false base station 140. The process is referred to as a fake cell avoidance process.

In various examples, the wireless communication network 100 can be various wireless communication networks. In one example, the wireless communication network 100 is in compliance with the 3rd Generation Partnership Project (3GPP) standards. For example, the wireless communication network 100 can be a Global System for Mobile Communications (GSM) network, a Universal Mobile Telecommunications System (UMTS) network, a Long-Term Evolution (LTE) network, and the like. In other examples, the wireless communication network 100 can be a network incompliance with other wireless communication standards.

The UE 150 can be a mobile device capable of communicating with the base stations 110-130, such as a mobile phone, a laptop computer, a tablet computer, a gaming machine, a communication device carried in a vehicle, a wearable device, and the like. In other examples, the UE 150 can be a stationary device installed at a specific location capable of communicating with the base stations 110-130. For example, the wireless communication network 100 implements the 3GPP Narrow Band IoT (NB-IoT) standard in one example, and the UE 150 transmits data through a NB-IoT connection provided by the wireless communication network 100. The UE 150 can include a subscriber identification module (SIM) card containing integrated circuit and one or more applications, such as a SIM application or a universal subscriber identification module (USIM) application.

Each base station 110-130 manages radio communication with between each base station 110-130 and the UE 150 or other UEs. For example, the base station 110-130 exchanges signaling messages with the UE 150 based on a set of access network protocols to create and maintain communication sessions between the UE 150 and the base station 110-130. The communication sessions provide communication channels for transmission of upper layer signaling messages between the UE and network components inside the network 110, such as the MMN 160. In addition, each base station 110-130 may perform other functions, such as paging the UE 150, over-the-air security, handovers, and the like.

In one example, the MMN 160 performs functions of subscriber authentication, security context establishment (setting up integrity and encryption for transmission of signaling messages), resource allocation for UEs, tracking UE's location, and the like. The wireless communication network 100 can include other components to fulfill various functions of a wireless communication networks. For example, the wireless communication network 100 can include a subscriber database including subscription information of users of the wireless communication network 100, packet switch or circuit switch core network nodes, gateway equipment for communicating with other networks (e.g., the Internet). Those components are not shown in FIG. 1.

According to an aspect of the disclosure, during some network service request procedures, the UE 150 can transmit an unencrypted request message to the MMN 160 which in turn may transmit a non-integrity-protected reject message to the UE 150 as a response to the unencrypted request message. For example, when the UE 150 is powered on and attempts to obtain an initial access to the wireless communication network 100, the UE 150 can transmit an attach request message to the MMN 160. The attach request message may trigger a mutual authentication procedure and establish security context. The security context can include security keys for encryption and integrity protection of messages between the UE 150 and the MMN 160. However, the initial attach request message is transmitted before establishment of the mutual authentication and security context, thus can be unencrypted. The attach request message can include identification (ID) of a Subscriber Identity Module (SIM) card, and the MMN 160 may check a subscriber database to verify validity of the SIM card. Assuming the SIM card is invalid, the MMN 160 may transmit a reject message without carrying out the mutual authentication procedure. Accordingly, the reject message can be transmitted without integrity protection.

In another example, assume the UE 150 moves from another tracking area to the current location belonging to a new tracking area managed by the MMN 160. The UE 150 can transmit a tracking area update (TAU) request message to the MMN 160 to inform the wireless communication network 100 the UE's current location. The TAU request message can be unencrypted due to operator's configuration to the wireless communication network 100. In addition, in response to the TAU request, the MMN 160 may transmit a reject message without integrity protection. For example, a UE can operate in different mode (e.g., LTE, GSM, and UMTS) for different type of services, such as Evolved Packet System (EPS) service, or non-EPS service (e.g. text message, and voice), depending on configuration or capability of the UE. The TAU request message can include service types the UE 150 is requesting for. After receiving the TAU request, the MMN 160 may check the UE's subscription information in a subscriber database or network capability of the wireless communication network 100. As a result, part of the requested service types may be refused, and a TAU reject message without integrity protection can be transmitted informing the UE 150 a reason of the rejection.

In further examples, other requests for network services, such as routing area update (RAU) request, service request, authentication request, and the like, may be unencrypted and reject messages corresponding to those requests can be non-integrity-protected.

According to an aspect of the disclosure, the above described procedures incurring unprotected request messages and reject messages can be employed by an attacker to cause a denial of service to a UE. For example, the attacker can introduce the false base station 140 into the wireless communication network 100 as shown in FIG. 1. The false base station 140 can create a fake cell 141 that overlaps other legitimate cells, such as the cells 111-131. The false base station 140 can be configured with parameters copied from an authentic cell. For example, the false base station 140 can copy parameters of the cell 121 and pretend to be the station 120.

When a UE entering the fake cell 141 or previously existing in the coverage of the fake cell 141 may select the fake cell 141 and camp on the fake cell 141. For example, the UE 150 approaching the fake cell 141 may detect the fake cell 141 transmitting a signal stronger than other surrounding cells 111 and 131, and subsequently initiates a cell reselection procedure. As the system information parameters of the false base station 140 are the same as an authentic cell 120, the UE 150 can be cheated to camp on the fake cell 141. In an alternative example, when powered on, the UE 150 can initiate a cell selection procedure selecting and camping on the fake cell 141.

While camping on the cell, the UE 150 can transmit a request for network service, such as a TAU request, an attach request, and the like. As the request message can be unencrypted, the false station 140 can interpret the message, and transmit back a fake reject message that is non-integrity-protected. As the reject message is non-integrity-protected, the UE 150 is unable to determine whether the reject message is genuine or not and consequently will accept the reject message as genuine. For example, the UE 150 may believe the reject message is transmitted from the base station 120.

Thereafter, the UE 150 may react to the reject message, which can cause the UE 150 to turn into an out of service state. Specifically, a reject message can include a reject cause specifying a reason for the rejection. Upon reception of a reject message, the UE 150 behaves according to the reject cause carried by the reject message. For example, in one example, the wireless communication network 100 is an LTE network, and an attach reject message can include a reject cause "illegal mobile equipment (ME)" indicating the UE 150 might be a stolen device. As a reaction to such a reject cause, the UE 150 considers the SIM card as invalid and will not try selecting other available cells even though the UE 150 is a legitimate device and has valid subscriptions to certain services. Consequently, the UE 150 is restricted to an out of service state until the UE 150 is rebooted. A reject cause in a reject message causing the UE 150 to lose all or part of services to which the UE 150 has subscribed is referred to as a fatal reject.

In various examples, various requests for network service can be transmitted in respective procedures in the wireless communication network 100. The various requests can include attach request, location updating request, GPRS attach request, routing area updating request, EPS attach request, tracking area updating request, and the like. Reject messages corresponding to those requests can include similar causes or different causes depending on reasons associated with the rejections. Part of the reject causes can be fatal causes that would lead the UE 150 turning into an out of service state. As an example, 3GPP standards specify some causes that may deny part or all of services to a UE. In 3GPP specifications, causes #3 (Illegal Mobile Station (MS)), #6 (Illegal ME), #8 (EPS Services and Non-EPS Services not Allowed) make a UE consider its USIM invalid for both packet service (PS) and circuit service (CS) domains; cause #7 (EPS Service not Allowed) affects PS domain and make USIM invalid for GPRS or EPS services; cause #2 affects CS domain and make USIM invalid for CS or Non-EPS services. In addition, a UE can be kept in the above state until the UE is rebooted as specified by the 3GPP specifications.

Exploiting the above fatal reject causes, the false station 140 can manipulate a reject message when receiving a request for network service. The false station 140 can embed a fatal reject cause into the reject message and cause the UE 150 to lose all or part of services the UE 150 has legitimately subscribed until the UE 150 is restarted.

In order to solve the above attack caused by the false base station 140, in one example, the UE 150 is configured to perform the fake cell avoidance process to avoid the attack caused by the false base station 140. For example, as a reaction to reception of a reject message including a fatal reject cause, the UE 150 can start to obtain access to other neighboring cells, such as the cells 111 and 131 instead of turning into an out of service state. At the same time, the UE 150 can establish a set-aside cell list and add the cell 141 (or the cell 121, as the UE 150 cannot discriminate between the two cells 141 and 121) to this set-aside cell list. The cell 141 is kept in the list for a preconfigure period of time. During this preconfigured period of time, the UE 150 will avoid selection of the cell 141 again when performing cell selection or reselection procedures. When the preconfigured period of time expires, the cell 141 is removed from the set-aside cell list. Assuming the false base station 140 disappears before the expiration of the preconfigured period of time, the cell 121 can be included in candidate cells again for the UE's 150 cell selection or reselection operation.

In addition, the UE 150 can employ a rejection counter to count the times the UE 150 has been rejected by a non-integrity-protected reject message while trying to access other cells. For example, assuming the UE 150 contains an invalid SIM card and no fake cell exists, the UE 150 may receive a genuine reject without integrity protection when accessing a surrounding cell. With help of the rejection counter, the UE 150 can terminate the trial on other suitable cells when the number of cells having been accessed reaches a threshold.

Figure 2A:
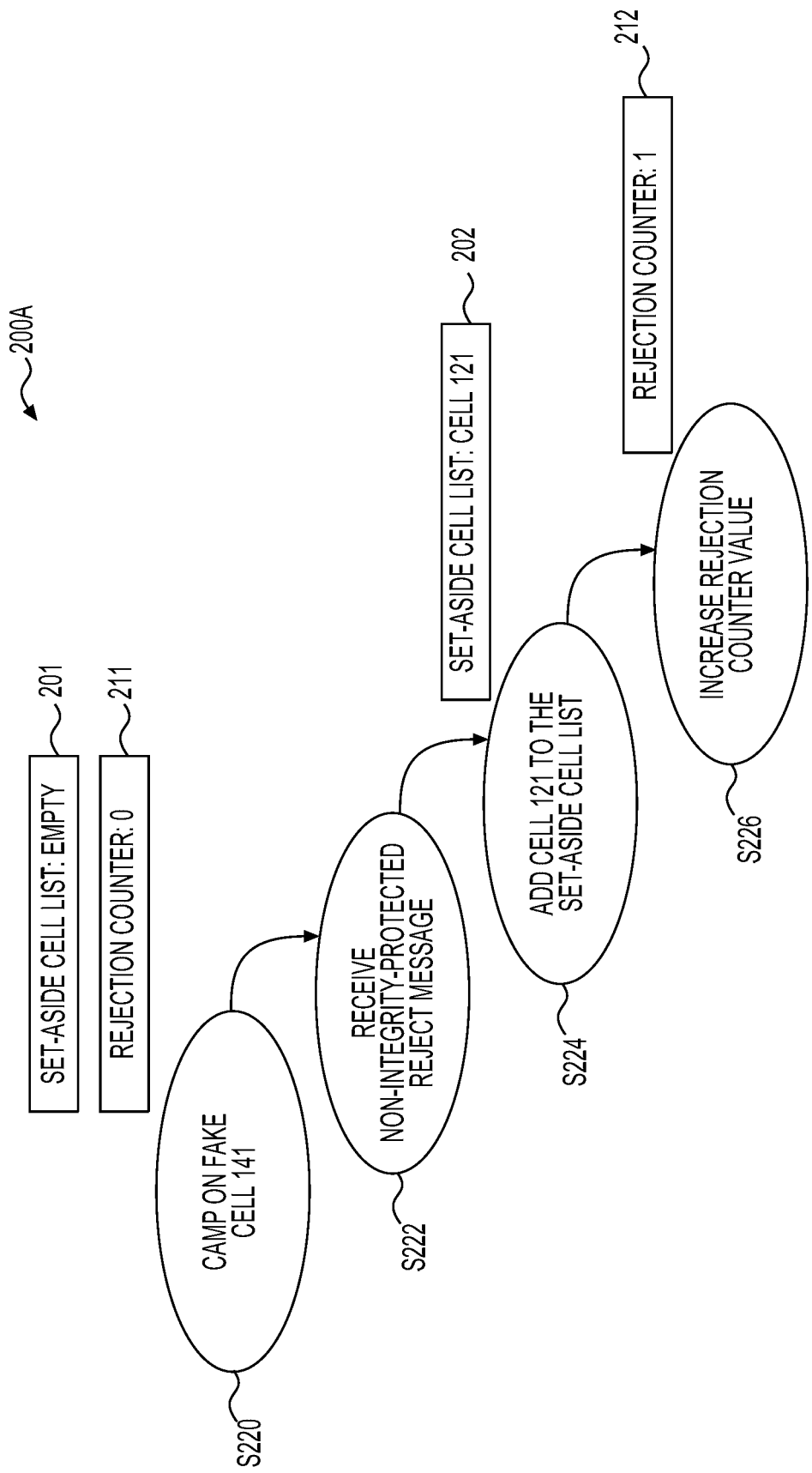
FIGS. 2A-2C illustrate an example fake cell avoidance process according to an embodiment of the disclosure.
Figure 2B:
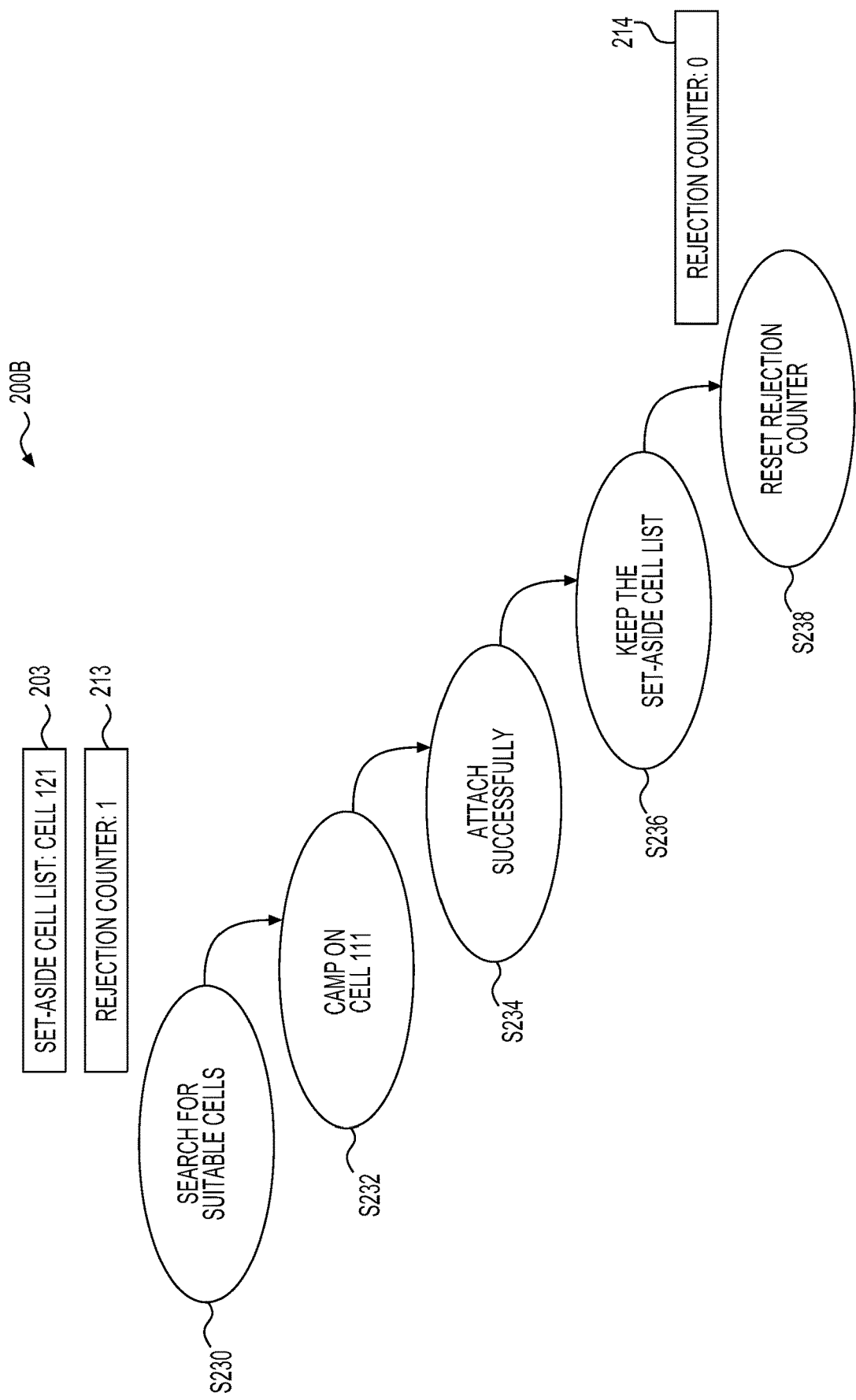
Figure 2C:
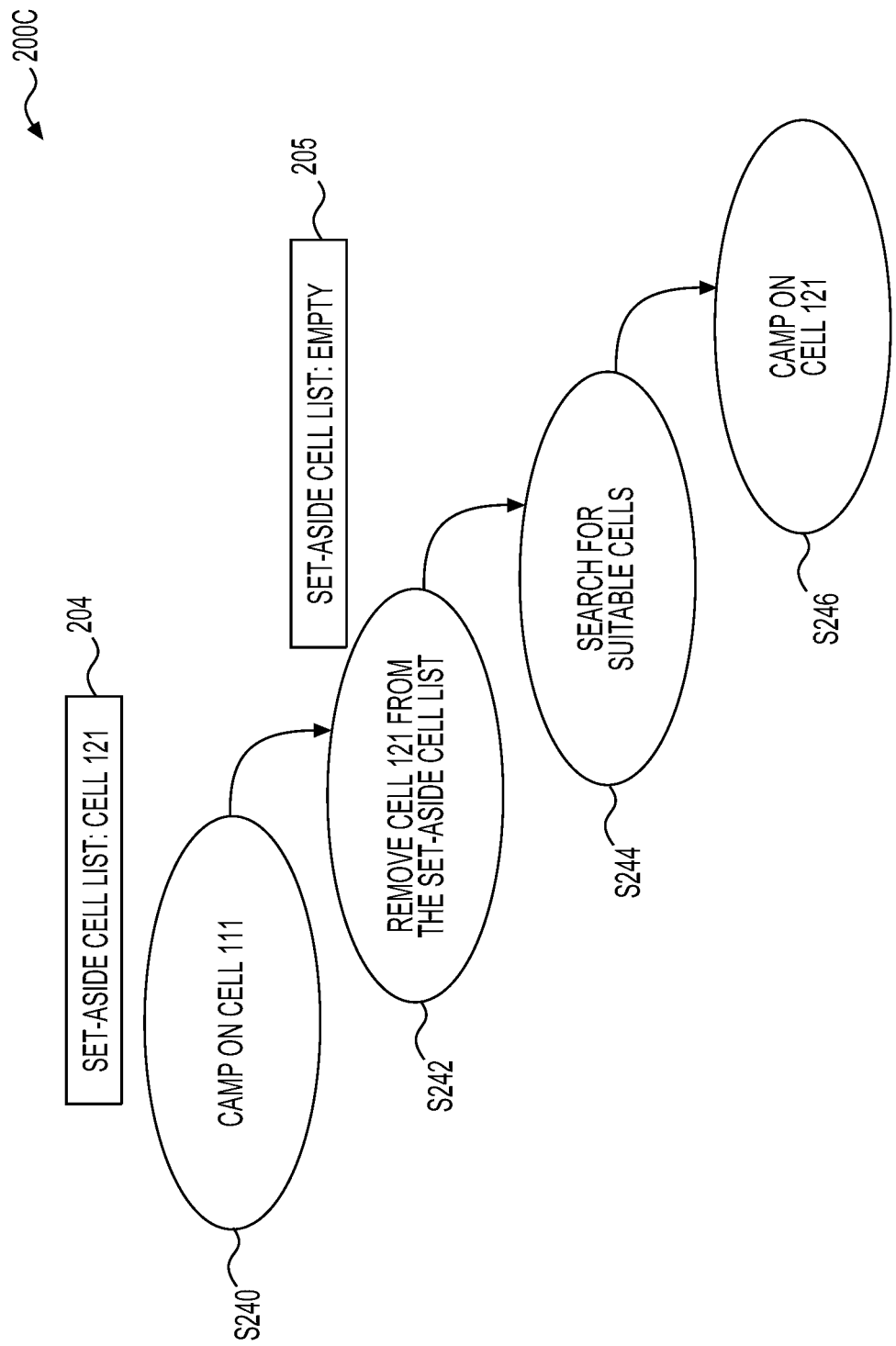

FIGS. 2A-2C illustrate an example fake cell avoidance process according to an embodiment of the disclosure. The example process corresponds to a scenario that a false base station is presented, and a UE contains a valid SIM card and receives an initial reject message from the false base station. The example process can include three phases 200A-200C shown in FIGS. 2A-2C, respectively. Each phase 200A-200C can include multiple steps. FIG. 1 example is used to explain the example fake cell avoidance process in FIGS. 2A-2C.

At S220 in the first phase 200A in FIG. 2A, the UE 150 camps on the fake cell 141. For example, the UE 150 is located inside of the coverage of the cells 111-131 as well as the fake cell 141, and the fake cell 141 mimics the genuine cell 121. The UE 150 is powered on and performs a cell selection process. In one example, as a result of a power scan process, the cells 111/131 and the fake cell 141 are listed as candidate cells in an order according to signal strength measured by the UE 150. As the UE 150 is closer to the false base station 140 and receives a stronger signal from the cell 141 than the cells 111 and 131, the fake cell 141 may have highest priority among candidate cells. Accordingly, the UE 150 selects the fake cell 141 to camp on. For example, the UE 150 synchronizes with the false base station 140 and receives system parameters from the false base station 140, and accordingly adjusts parameters of the UE 150 to make the UE 150 ready for communicating with the false base station 140. At S220, a set-aside cell list is employed. At state 201, the set-aside cell list is empty. In addition, a rejection counter is employed. At state 211, the rejection counter has a zero value.

At S222, the UE 150 receives a non-integrity-protected reject message. For example, after camping on the fake cell 141, the UE 150 can initiate an attach procedure and transmits an unencrypted attach request to the false base station 140. The false base station 140 receives and interprets the unencrypted attach request, and returns an attach reject message that are not integrity-protected. The attach reject message can include a fatal cause, such as "illegal UE". As the fake cell 141 uses system parameters copied from the cell 121, the UE 150 cannot recognize whether the reject message is from the genuine base station 120 or the false base station 140.

At S224, the UE 150 adds the cell 121 to the set-aside cell list as a response to reception of the non-integrity-protected reject message. As shown, the set-aside cell list in state 202 includes the cell 121. In one example, a global cell identity in the wireless communication network 100 is used to represent a cell listed in the set-aside cell list. In another example, a combination of location information and a physical cell identity is used to indicate a cell listed in the set-aside cell list. In other examples, other methods for representing a cell in the set-aside list are possible. At S226, the UE 150 increases the rejection counter value. As shown, the rejection counter in state 212 has a value of 1 indicating one non-integrity-protected reject has been received.

At S230 in the second phase 200B in FIG. 2B, the UE 150 searches for other suitable cells to camp on. At S230, the set-aside cell list in state 203 includes the cell 121, and the rejection counter in state 213 has a value of 1. In one example, the UE 150 initiates another round of cell selection process, however, cells included in the set-aside cell list is excluded from the cell selection process. Alternatively, a candidate list obtained at S220 in phase 200A can be reused, but excluding cells included in the set-aside cell list. In either way, selection of the fake cell 141 can be avoided.

At S232, the UE 150 camps on the cell 111. For example, the cell 111 can have the strongest signal strength among surrounding cells except cells in the set-aside cell list, thus is selected. At S234, an attach request sent to the base station 110 is accepted by the MMN 160, and the UE 150 attaches to the wireless communication network 100 successfully. For example, after camping on the cell 111, the UE 150 can initiate an attach procedure and transmit an attach request to the MMN 160 via the base station 110. The MMN 160 may first verify whether the UE 150 is a valid subscriber based on a subscriber ID stored in the SIM card of the UE 150. Thereafter, the MMN 160 may initiate an authentication process, register the UE 150, and subsequently assign network resources to the UE 150.

At S236, the UE 150 keeps the set-aside cell list. For example, after the cell 141 is added to the set-aside cell list, a timer can be started. The cell 141 will be kept on the set-aside list until the timer is expired. Before expiration of the timer, the cell 141 is excluded from candidate cells for the UE's 150 cell selection or reselection operations. For example, the UE 150 may move away from its current location and move back, or may be power off and powered on, and may thus perform several rounds of cell selection or reselection procedures. However, due to the set-aside cell list, the UE 150 does not consider the cell 141 for the cell selection or reselection operations. In one example, the timer is configured to be within a range of 12-48 hours. In another example, the timer is configured to be within a range of 2-10 hours. At S238, the UE 150 resets the rejection counter to 0 as shown in the state 214 of the rejection counter.

At S240 in the third phase 300C in FIG. 3C, the UE 150 camps on the cell 111. The set-aside cell list in state 204 includes the cell 121. At S242, the UE 150 removes the cell 121 from the set-aside cell list. Accordingly, as shown, the set-aside list in state 205 is empty. In one example, the timer associated with the cell 121 is expired. As a response to expiration of the cell 121, the UE 150 removes the cell 121 from the set-aside list. In another example, when the UE 150 leaves the current location and travels a distance above a preconfigured threshold, the cell 121 is removed from the set-aside list. For example, the radius of the fake cell 141 may be in the range of 100-200 meters, while the radius of the genuine cell 121 may be in a range of 1000-2000 meters. After the UE 150 has travelled a preconfigured distance across the fake cell 141, for example 500 meters, the UE 150 can be at a location outside of the fake cell 141 but within the cell 121. When the cell 121 is removed from the set-aside cell list, the UE 150 can consider the cell 121 to be a candidate cell for the UE's 150 selection operations. In one example, the UE 151 includes a positioning circuit providing location data indicating a location of the UE 151. In one example, at S242, the UE 150 does not remove the cell 121 from the set-aside cell list. Instead, access to cells previously added to the set-aside cell list is allowed for cell selection procedures. For example, after the timer associated with the cell 121 is expired, or the UE 151 travels a preconfigured distance from the current location where the cell 121 is added to the set-aside cell list, the cell 121 is allowed to be considered as a candidate cell for cell selection or reselection procedures.

At S244, the UE 150 searches for other suitable cells. For example, the UE 150 continues to monitor signal strength and other parameters of surrounding cells except cells included in the set-aside list. When a cell better than the cell 111 is detected, a cell reselection procedure can be triggered.

As the cell 121 has been removed from the set-aside list, the UE 150 now will consider the cell 121 while performing cell selection or reselection operations. Assuming the fake cell 141 has disappeared and the cell 121 transmits a signal stronger than the cell 111 towards the UE 150, the cell 121 can be determined to be a better cell than the cell 111. However, if the fake cell 141 is still in operation, the fake cell 141 may be determined to be a candidate cell better the cell 111. At S246, assuming the fake cell 121 has been removed, the UE 150 camps on the cell 121.

Figure 3A:
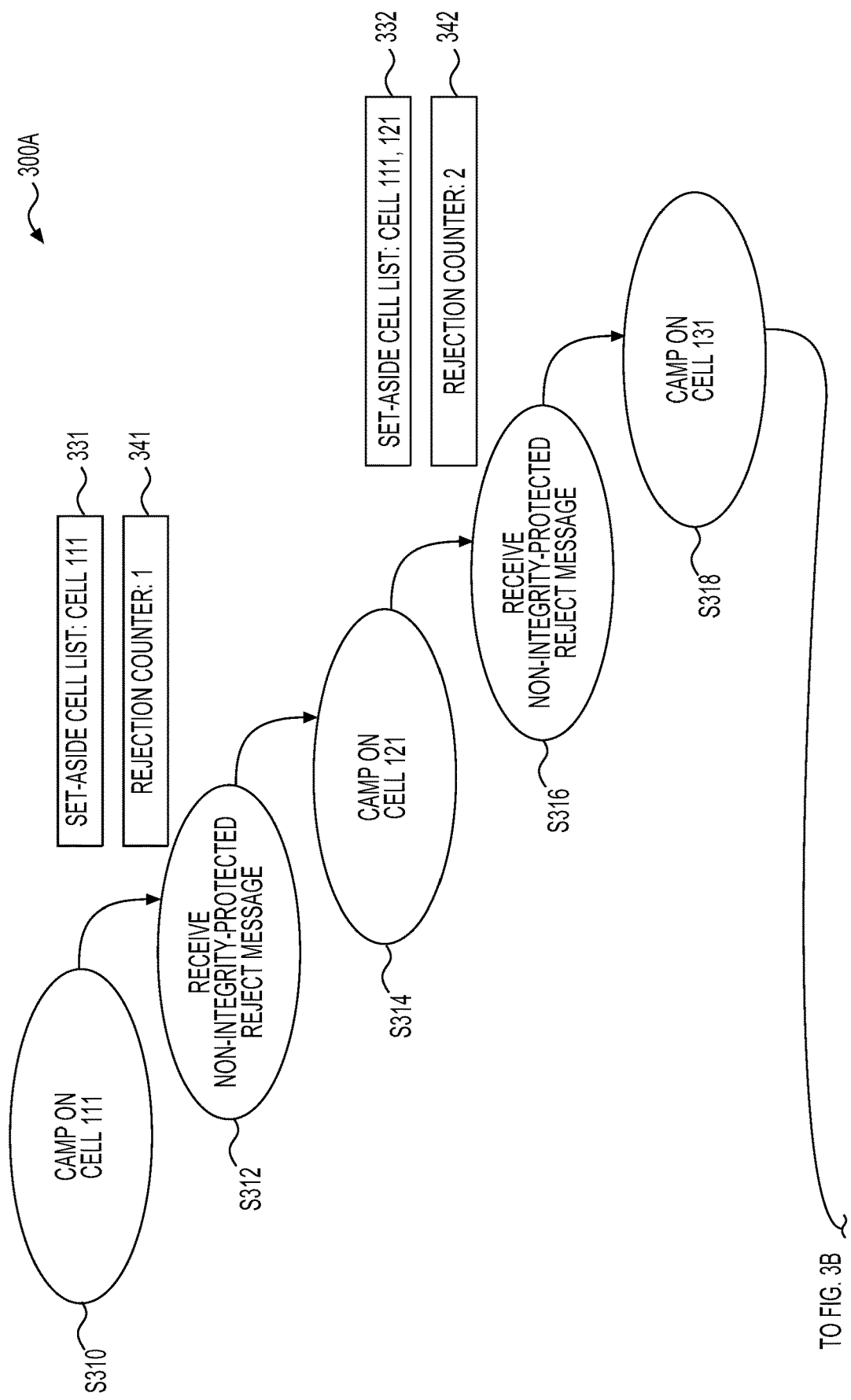
FIGS. 3A-3B shows another example fake cell avoidance process according to an embodiment of the disclosure.
Figure 3B:
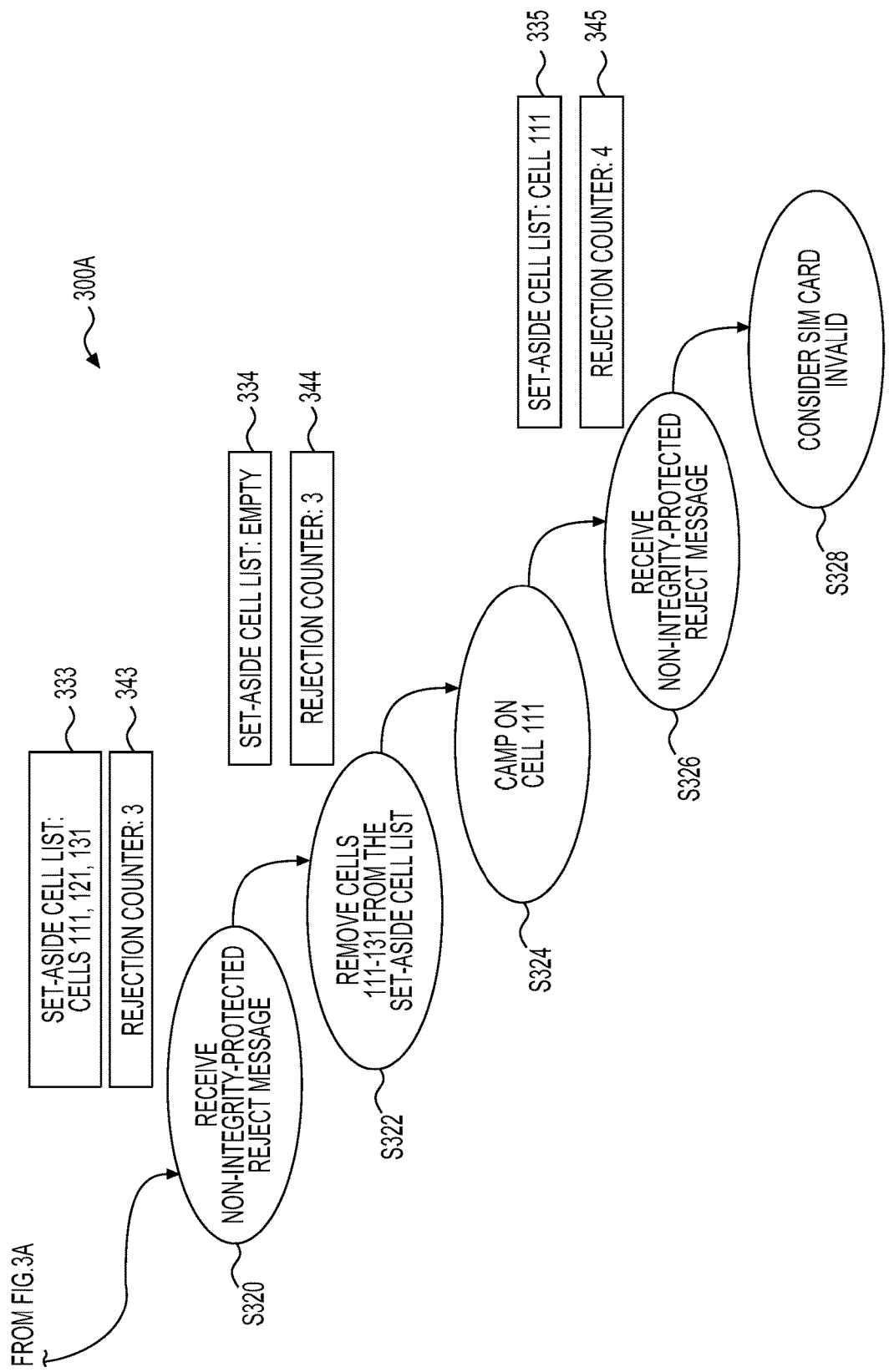

FIGS. 3A-3B shows another example fake cell avoidance process 300A/300B according to an embodiment of the disclosure. The example process 300A/300B corresponds to a scenario that no false base station is presented, and a UE contains an invalid SIM card and receives an initial reject message from a genuine base station. FIG. 1 example is used to explain the example process 300A/300B, however, assuming the false base 140 station does not exist.

At S310, the UE 150 camps on the cell 111. For example, the UE 150 is powered on and initiates a cell selection procedure. As a result of a power scan procedure, a candidate cell list can be obtained. The candidate cell list can be ordered according to signal strengths of the candidate cells. The cell 111 has the highest signal strength among the candidate cells and is selected by the UE 150 to camp on.

At S312, the UE 150 receives a non-integrity-protected reject message from the cell 111. For example, the UE 150 transmits an attach request to the MMN 160 while camping on the cell 111. The attach request includes an ID of the SIM card of the UE 150. The MMN 160 checks a subscriber database to verify if the SIM card is valid for certain services using the received ID. In addition, the MMN 160 may check other database, such as a stolen device database to verify whether the UE 150 is a stolen device. As the SIM card is invalid for any services, the MMN 160 can return an attach reject message without proceeding with an authentication process. The attach reject message can be non-integrity-protected. The attach reject message may include a reject cause, such as, "all services not allowed". Upon receiving the reject message, the UE 150 can add the cell 111 to a set-aside cell list and increase a rejection counter value. As shown, a set-aside cell list in state 331 includes the cell 111, and a rejection counter in state 341 has a value of 1.

At S314, the UE 150 camps on the cell 121. Operations similar to that at S310 can be performed by the UE 150 to select the cell 121 and camps on the cell 121. At S316, the UE 150 receives a second non-integrity-protected reject message from the cell 121, as the SIM card of the UE 150 is invalid. Operations similar to that at S312 can be performed by the UE 150. As shown, the set-aside cell list in state 332 includes two cells 111 and 121, and the rejection counter in state 342 has a value of 2.

At S318, the UE 150 camps on the cell 131. Operations similar to that at S310 can be performed by the UE 150. At S320, the UE 150 receives a third non-integrity-protected reject message from the cell 131. Operations similar to that at S312 can be performed by the UE 150. As shown, the set-aside cell list in state 333 includes three cells 111-131, the rejection counter in state 343 has a value of 3.

At S322, the UE 150 removes the previously added cells 111-131 from the set-aside cell list. For example, a threshold of 4 has been preconfigured for the rejection counter, and the UE 150 can try at most four suitable cells when an initial request for network service is rejected. When no more suitable cells are available for selection before the threshold is reached, the UE 150 can remove the previously added cells from the set-aside cell list. In FIG. 1 example, there are no more cells available for cell selection besides the cells 111-131 after S320. Accordingly, the UE 150 can remove the cells 111-131 from the set-aside cell list. In this way, the UE 150 can try to access those cells again before the threshold is reached. As shown, the set-aside cell list in state 334 includes no cells, while the rejection counter in state 344 maintains the value of 3. Alternatively, at S322, the UE 150 does not remove the previously added cells 111-131 from the set-aside cell list. Instead, access to cells previously added to the set-aside cell list is allowed for cell selection procedures. For example, when no more suitable cells are available for selection before the threshold is reached, the UE 150 can allow the cells 111-131 to be considered as candidate cells for cell selection or reselection procedures.

At S324, the UE 150 camps on the cell 111. Operations similar to that at S310 can be performed by the UE 150. At S326, the UE 150 receives a fourth non-integrity-protected reject message from the cell 131. Operations similar to that at S312 can be performed by the UE 150. As shown, the set-aside cell list in state 335 includes the cell 111, the rejection counter in state 343 has reached a value of 4 equal to the preconfigure threshold value.

At S328, the UE 150 considers the SIM card invalid. After four times of trial, as the rejection counter has reached the preconfigured threshold, the UE 150 accepts that the SIM card is invalid and stop trying to access to other cells.

Figure 4:
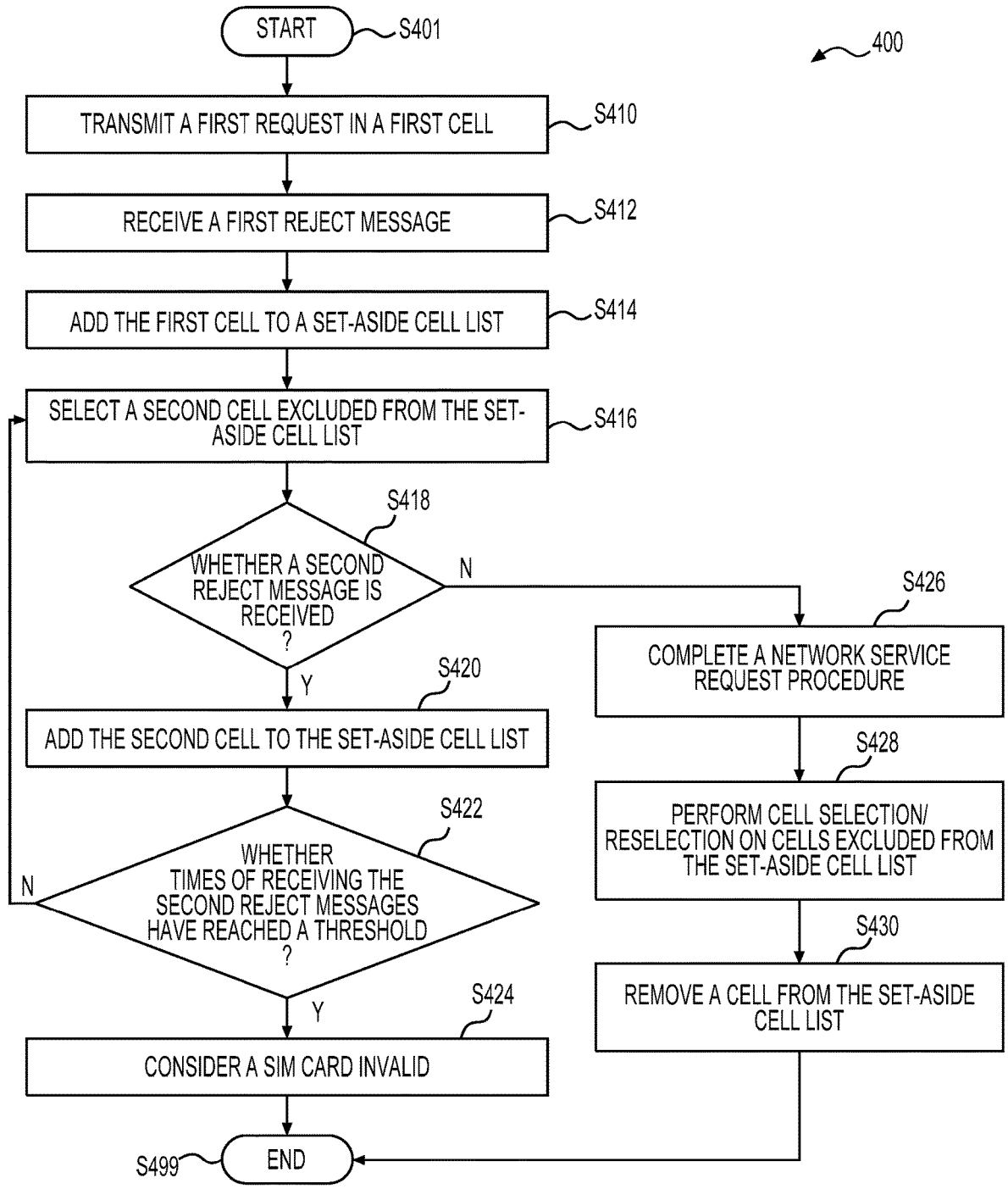
FIG. 4 shows a flowchart of an exemplary fake cell avoidance process according to an embodiment of the disclosure.

FIG. 4 shows a flowchart of an exemplary fake cell avoidance process 400 according to an embodiment of the disclosure. The process 400 can be performed by the UE 150 in FIG. 1 example to avoid reselection of a fake cell. The process 400 starts at S401 and proceeds to S410.

At S410, a first request for network service of a wireless network is transmitted from UE to a MMN in the wireless network. The UE can contain a SIM card. The UE can be camping on a first cell. The UE cannot recognize whether the first cell is a fake cell or a genuine cell. The request for network service can be an attach request, a TAU request, a RAU request, a service request, a registration request, an authentication request, and the like. Message of the first request can be unencrypted.

At S412, a first reject message without integrity protection can be received. The first reject message can include a fatal cause. The UE cannot recognize whether the first reject message is transmitted from a genuine base station or a false base station.

At S414, the first cell is added to a set-aside cell list as a response to receiving the first reject message without integrity protection.

At S416, a second cell excluded in the set-aside cell list is selected by the UE to camp on. For example, the UE may perform a cell selection procedure on cells not included in the set-aside cell list. In this way, in case the first cell is a fake cell, the reselection of the fake cell can be avoided. The UE transmits a second request for network service while camping on the second cell.

At S418, it is determined whether a second reject message without protection is received. When a second reject message without protection is received, the process 400 proceeds to S420. Otherwise, when the second request is accepted by the MMN in the wireless communication network, the process 400 proceeds to S426.

At S420, the second cell is added to the set-aside cell list as a response to receiving the second reject message without integrity protection.

At S422, it is determined whether times of receiving the second reject messages have reached a threshold. When the threshold is reached, the process 400 proceeds to S424; otherwise, the process 400 returns to S416.

At S424, the SIM card is considered invalid by the UE. The UE turns into an out of service state. The process 400 proceeds to S499 and terminates at S499.

At S426, the network service request procedure is completed. For example, corresponding to different requests for network service, operations related to a certain request can be performed by the UE and the MMN. The operations can include SIM card ID verification, mutual authentication, resource allocation, location registration, connection establishment, and the like. After the completion of the network service request procedure, the UE may turn into an idle state while camping on a second cell.

At S428, cell selection or reselection are performed on cells excluded from the set-aside list. For example, the UE may perform a cell selection process after being powered on. For another example, the UE may move around and may reselect a cell to camp on while moving. The UE may monitoring surrounding cells while camping on a cell, and perform a cell reselection process when a cell reselection criterion is satisfied. During the cell selection or reselection process, the cells contained in the set-aside cell list are excluded from candidate cells. Thus, a fake cell listed in the set-aside cell list can be avoided.

At S430, a cell is removed from the set-aside cell list after the cell has been added to the set-aside cell list for a preconfigured time period. For example, the first cell can be removed from the set-aside cell list after the first cell has been added to the set-aside cell list for 24 hours. Accordingly, assuming a fake cell mimics the first cell and disappears before the 24 hours expires, the first cell as a genuine cell can now be selected or reselected by the UE. The process 400 proceeds to S499 and terminates at S499.

Figure 5:
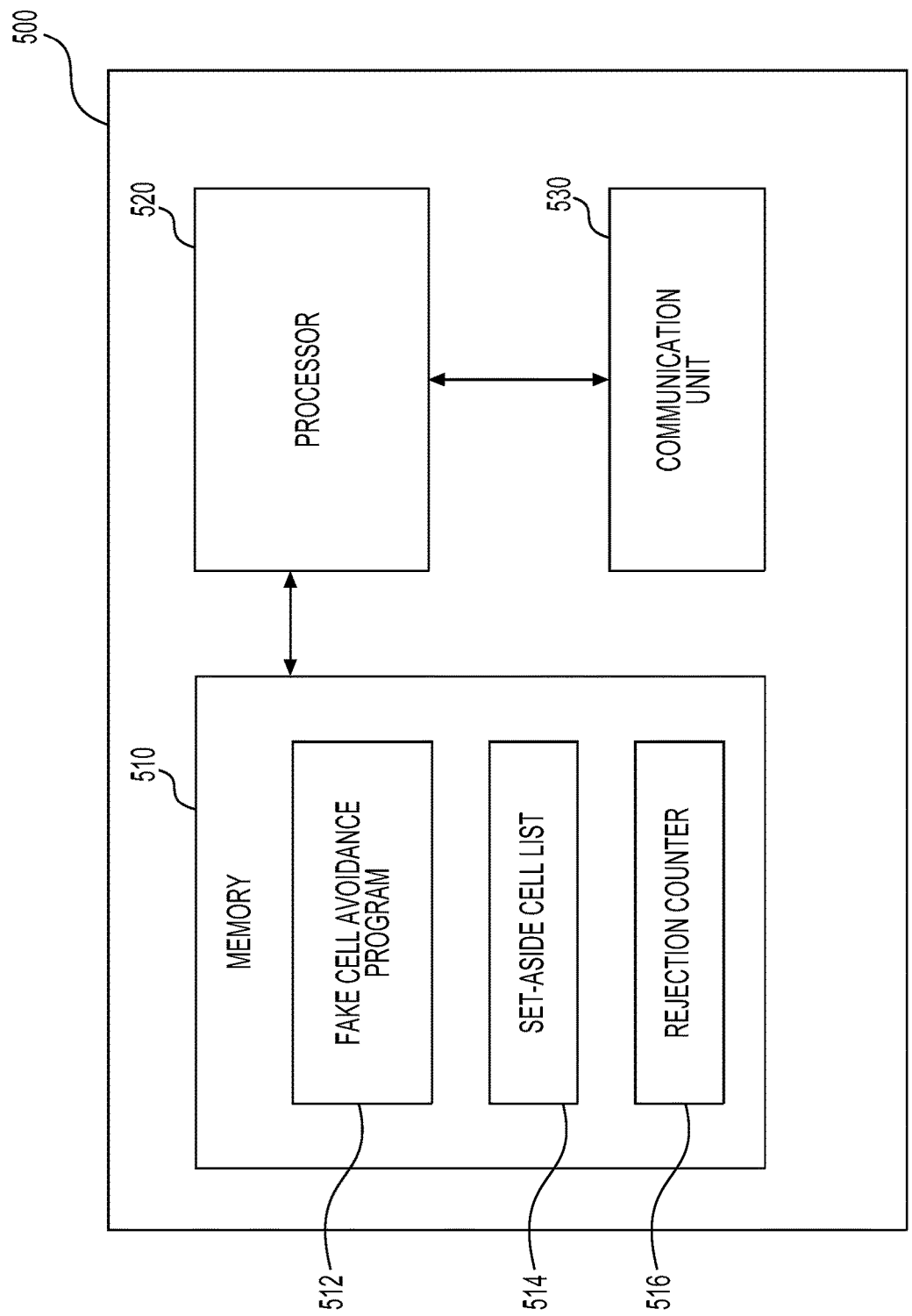
FIG. 5 shows a block diagram of example user equipment according to an embodiment of the disclosure.

FIG. 5 shows a block diagram of an example UE 500 according to an embodiment of the disclosure. The UE 500 can implement a fake cell avoidance process described above and perform functions of the UE 150 in FIG. 1 example. The UE 500 can include a memory 510, a processor 520, and a communication unit 530. Those components are couple together as shown in FIG. 5.

The UE 500 can be any suitable device, such as a utility meter, a desktop computer, a laptop computer, a mobile phone, a tablet, a smart watch, and the like. The UE 500 can include other suitable components (not shown), such as a SIM card interface, a positioning circuit, a display, a touch-screen, a microphone, and the like. In one embodiment, the UE 500 includes a single integrated circuit (IC) chip that integrates various circuits, such as the processor 520, the memory 510, the communication unit 530, and the like, on the single IC chip. In another embodiment, the UE 500 includes multiple IC chips, such as a processor chip, a memory chip, a communication chip, and the like.

The processor 520 can include one or more processing units, and execute instructions stored in the memory 510 to perform various functions. Particularly, the processor 520 can perform a fake cell avoidance program stored in the memory 510 to perform a fake cell avoidance process, such as the processes described with reference to FIGS. 1-4. In an example, the processor 520 is a multi-core processor, such as a dual-core processor, a quad-core processor, and the like. In addition, the processor 520 can have any suitable architecture, such as an x86 architecture, a reduced instruction set computing (RISC) architecture, a complex instruction set computing (CISC) architecture, and the like. In an example, the UE 500 is a mobile device having an advanced RISC machine (ARM) type processor.

The memory 510 can include one or more storage media and store various computer executable instructions. The storage media include, but are not limited to, hard disk drive, optical disc, solid state drive, read-only memory (ROM), dynamic random access memory (DRAM), static random access memory (SRAM), flash memory, and the like.

The memory 510 can store a fake cell avoidance program 512. The fake cell avoidance program 512 include instructions that, when executed by the processor 520, can cause the processor 520 to perform functions of the fake cell avoidance processes described above. In addition, the memory 510 can be configured to store a set-aside cell list 514, and a rejection counter 516 that store data generated from a fake cell avoidance process. The memory 510 can further stores other programs or data useful for the UE 500 to perform various functions. For example, the memory 510 can store operating system programs, application programs (e.g., email, text message, Internet browser, and the like), programs for processing various communication protocols (e.g., protocols of GSM, UMTS, LTE communication systems).

The communication unit 530 can include signal processing circuits and a radio frequency (RF) module. The signal processing circuits can be configured to process control signals or traffic signals received from the processor 520 according to specific communication standards, such as the 3GPP GSM, UMTS, LTE standards. The RF module can up converts a baseband signal received from the signal processing circuits to an RF signal and transmits the RF signal into the air. Conversely, the RF module can down converts an RF signal to a baseband signal and transmit the baseband signal to the processing circuits.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
    transmitting a first request for a network service in a first cell of a wireless communication network of a radio access technology (RAT) belonging to a selected public land mobile network (PLMN) from user equipment;
    receiving a first reject message without integrity protection in the first cell of the wireless communication network of the RAT belonging to the selected PLMN at the user equipment;
    in response to receiving the first reject message, adding the first cell of the wireless communication network of the RAT belonging to the selected PLMN to a set-aside cell list that uses a cell identity (ID) to represent each cell on the set-aside cell list, wherein each cell on the set-aside cell list is added to the set-aside cell list in response to receiving a reject message without integrity protection in the respective cell; and
    in response to receiving the first reject message, selecting a cell from other cells of the wireless communication network of the RAT belonging to the selected PLMN that are not included in the set-aside cell list to request the network service, wherein the selected cell and the first cell belong to the same PLMN, and are of the same RAT.

2. The method of claim 1, wherein selecting a cell from other cells of the same wireless communication network that are not included in the set-aside cell list to request network service includes:
    selecting a second cell excluded from the set-aside cell list to transmit a second request for the network service; and
    when a second reject message without integrity protection is received, adding the second cell to the set-aside cell list.

3. The method of claim 2, wherein selecting a cell from other cells of the same wireless communication network that are not included in the set-aside cell list to request network service further includes:
    repeating selecting a second cell excluded from the set-aside cell list and adding the second cell to the set-aside cell list when a second reject message without integrity protection is received until a second request for the network service is accepted.

4. The method of claim 3, wherein selecting a cell from other cells of the same wireless communication network that are not included in the set-aside cell list to request network service further includes:
    repeating selecting a second cell excluded from the set-aside cell list and adding the second cell to the set-aside cell list when a second reject message without integrity protection is received until times of receiving the second reject messages reach a threshold.

5. The method of claim 4, wherein selecting a cell from other cells of the same wireless communication network that are not included in the set-aside cell list to request network service further includes:
    when no more cells are available for selection, allowing to request network services from cells previously added to the set-aside cell list.

6. The method of claim 1, further comprising:
    allowing to request network services from a third cell previously added to the set-aside cell list after the third cell has been added to the set-aside cell list for a preconfigured period of time.

7. The method of claim 1, further comprising:
    allowing to request network services from a fourth cell previously added to the set-aside cell list when the user equipment travels a preconfigured distance from a location where the fourth cell is added to the set-aside cell list.

8. The method of claim 1, wherein the first reject message indicates the user equipment is illegal mobile equipment.

9. The method of claim 1, wherein the selected cell and the first cell have same system information.

10. User equipment, comprising processing circuitry configured to:
    transmit a first request for a network service in a first cell of a wireless communication network of a radio access technology (RAT) belonging to a selected public land mobile network (PLMN) from user equipment;
    receive a first reject message without integrity protection in the first cell of the wireless communication network of the RAT belonging to the selected PLMN;
    in response to receiving the first message, add the first cell of the wireless communication network of the RAT belonging to the selected PLMN to a set-aside cell list that uses a cell identity (ID) to represent each cell on the set-aside cell list, wherein each cell on the set-aside cell list is added to the set-aside cell list in response to receiving a reject message without integrity protection in the respective cell; and in response to receiving the first reject message, select a cell from other cells of the wireless communication network of the RAT belonging to the selected PLMN that are not included in the set-aside cell list to request the network service, wherein the selected cell and the first cell belong to the same PLMN, and are of the same RAT.

11. The user equipment of claim 10, wherein the processing circuitry is further configured to:
select a second cell excluded from the set-aside cell list to transmit a second request for the network service; and
when a second reject message without integrity protection is received, add the second cell to the set-aside cell list.

12. The user equipment of claim 11, wherein the processing circuitry is further configured to:
repeat selecting a second cell excluded from the set-aside cell list and adding the second cell to the set-aside cell list when a second reject message without integrity protection is received until a second request for the network service is accepted.

13. The user equipment of claim 12, wherein the processing circuitry is further configured to:
repeat selecting a second cell excluded from the set-aside cell list and adding the second cell to the set-aside cell list when a second reject message without integrity protection is received until times of receiving the second reject messages reach a threshold.

14. The user equipment of claim 13, wherein the processing circuitry is further configured to:
when no more cells are available for selection, allow to request network services from cells previously added to the set-aside cell list.

15. The user equipment of claim 10, wherein the processing circuitry is further configured to:
allow to request network services from a third cell previously added to the set-aside cell list after the third cell has been added to the set-aside cell list for a preconfigured period of time.

16. The user equipment of claim 10, wherein the processing circuitry is further configured to:
allow to request network services from a fourth cell previously added to the set-aside cell list when the user equipment travels a preconfigured distance from a location where the fourth cell is added to the set-aside cell list.

17. A non-transitory computer readable medium storing program instructions for causing a processor to perform operations, the operations comprising:
transmitting a first request for a network service in a first cell of a wireless communication network of the wireless communication network of the RAT belonging to the selected PLMN from user equipment;
receiving a first reject message without integrity protection in the first cell of the wireless communication network of the RAT belonging to the selected PLMN at the user equipment;
in response to receiving the first reject message, adding the first cell of the wireless communication network of the RAT belonging to the selected PLMN to a set-aside cell list that uses a cell identity (ID) to represent each cell on the set-aside cell list, wherein each cell on the set-aside cell list is added to the set-aside cell list in response to receiving a reject message without integrity protection in the respective cell; and
in response to receiving the first reject message, selecting a cell from other cells of the wireless communication network of the wireless communication network of the RAT belonging to the selected PLMN that are not included in the set-aside cell list to request the network service, wherein the selected cell and the first cell belong to the same PLMN, and are of the same RAT.

18. The non-transitory computer readable medium of claim 17, wherein selecting a cell from other cells of the same wireless communication network that are not included in the set-aside cell list to request network service includes:
selecting a second cell excluded from the set-aside cell list to transmit a second request for the network service; and
when a second reject message without integrity protection is received, adding the second cell to the set-aside cell list.

19. The non-transitory computer readable medium of claim 18, wherein selecting a cell from other cells of the same wireless communication network that are not included in the set-aside cell list to request network service further includes:
repeating selecting a second cell excluded from the set-aside cell list and adding the second cell to the set-aside cell list when a second reject message without integrity protection is received until a second request for the network service is accepted.

20. The non-transitory computer readable medium of claim 19, wherein selecting a cell from other cells of the same wireless communication network that are not included in the set-aside cell list to request network service further includes:
repeating selecting a second cell excluded from the set-aside cell list and adding the second cell to the set-aside cell list when a second reject message without integrity protection is received until times of receiving the second reject messages reach a threshold.

21. The non-transitory computer readable medium of claim 20, wherein selecting a cell from other cells of the same wireless communication network that are not included in the set-aside cell list to request network service further includes:
when no more cells are available for selection, allowing to request network services from cells previously added to the set-aside cell list.

22. The non-transitory computer readable medium of claim 17, wherein the operations further comprising:
allowing to request network services from a third cell previously added to the set-aside cell list after the third cell has been added to the set-aside cell list for a preconfigured period of time.

* * * * *